US012584402B2

(12) United States Patent
Moss

(10) Patent No.: US 12,584,402 B2
(45) Date of Patent: *Mar. 24, 2026

(54) METHOD AND APPARATUS FOR MAGNETIC RANGING WHILE DRILLING

(71) Applicant: Gunnar LLLP, Magnolia, TX (US)

(72) Inventor: Clinton Moss, Bakersfield, CA (US)

(73) Assignee: Gunnar LLLP, Magnolia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,924

(22) Filed: Sep. 6, 2024

(65) Prior Publication Data

US 2024/0426206 A1 Dec. 26, 2024

Related U.S. Application Data

(63) Continuation of application No. 18/457,139, filed on Aug. 28, 2023, now Pat. No. 12,110,780, which is a continuation of application No. 17/482,045, filed on Sep. 22, 2021, now Pat. No. 11,781,421.

(60) Provisional application No. 63/216,861, filed on Jun. 30, 2021, provisional application No. 63/081,692, filed on Sep. 22, 2020.

(51) Int. Cl.
| | |
|---|---|
| *E21B 47/0228* | (2012.01) |
| *E21B 7/04* | (2006.01) |
| *E21B 17/00* | (2006.01) |
| *E21B 44/00* | (2006.01) |

(Continued)

(52) U.S. Cl.
CPC ............ *E21B 47/0228* (2020.05); *E21B 7/04* (2013.01); *E21B 17/00* (2013.01); *E21B 44/00* (2013.01); *E21B 47/00* (2013.01); *G01D 5/14* (2013.01)

(58) Field of Classification Search
CPC .......... E21B 17/00; E21B 44/00; E21B 47/00; E21B 47/0228; E21B 7/04; G01D 5/14
See application file for complete search history.

(56) References Cited

U.S. PATENT DOCUMENTS

| | | | | |
|---|---|---|---|---|
| 4,372,398 A | * | 2/1983 | Kuckes | ............... E21B 47/0228 |
| | | | | 175/45 |
| 5,218,301 A | * | 6/1993 | Kuckes | .................... G01V 3/24 |
| | | | | 324/366 |

(Continued)

OTHER PUBLICATIONS

Petition for Post Grant Review (37 C.F.R. 42.200) and Exhibits 1001-1009.

*Primary Examiner* — Daniel P Stephenson
(74) *Attorney, Agent, or Firm* — Brian K. Buss

(57) ABSTRACT

Methods, devices and systems are disclosed for magnetically ranging while drilling with a coiled tubing unit or drill pipe by way of a an electrically conducive but environmentally electrically insulated wire installed through a coiled tubing spool or drill pipe complete with electrically insulative subs in the coiled tubing bottom hole assembly or drill pipe. The method and systems allow for the injection of excitation current into the formation by way of selectively electrifying various drill stem components, thereby facilitating current collection on a target tubular which radially emanates a magnetic field about the target well tubular(s). The method and devices allow for the construction of complex downhole current injection configurations which allow for modification of the bottom hole assembly to maximize target well signal generation in the presence of adverse environmental conditions.

21 Claims, 8 Drawing Sheets

(51) Int. Cl.
  E21B 47/00    (2012.01)
  G01D 5/14    (2006.01)

(56)                References Cited

U.S. PATENT DOCUMENTS 7,477,162 B2 *    1/2009  Clark ...................... E21B 47/01
                                                    340/854.6
     8,695,730 B2 *    4/2014  Clark ................. E21B 43/2406
                                                    166/50
     8,881,843 B2     11/2014  Todd
     9,360,580 B2 *    6/2016  Goswami ................ E21B 49/00
     9,404,354 B2 *    8/2016  Sugiura ................... E21B 7/046
     9,759,060 B2 *    9/2017  Kuckes ................... E21B 47/13
     9,771,791 B2      9/2017  Schulz
    10,429,534 B2     10/2019  Donderici
    10,656,301 B2      5/2020  Donderici
    11,236,551 B2      2/2022  Fredriksen
    11,781,421 B2 *   10/2023  Moss ...................... E21B 47/00
                                                    175/24
    11,965,415 B2      4/2024  Espen
    12,110,780 B2 *   10/2024  Moss ...................... E21B 47/00
  2007/0126426 A1 *    6/2007  Clark ...................... G01V 3/26
                                                    324/326
  2017/0329035 A1 *   11/2017  Wu ...................... E21B 47/0228
  2019/0119990 A1 *    4/2019  Fredriksen ............ E21B 17/028
  2022/0090484 A1 *    3/2022  Moss ................. E21B 47/0228
  2024/0003243 A1 *    1/2024  Moss ...................... E21B 47/00
  2024/0426206 A1 *   12/2024  Moss ................. E21B 47/0228

* cited by examiner

Bottom Hole
Assembly

Above gap short reel power source control unit guide coiled tubing

401

301

Adjacent target well pipe
302

203

301

204

402

BHA

METHOD AND APPARATUS FOR MAGNETIC RANGING WHILE DRILLING

CROSS-REFERENCE TO RELATED APPLICATIONS

This application is a continuation of U.S. patent application Ser. No. 18/457,139 filed on Aug. 28, 2023, now U.S. Pat. No. 12,110,780, which is a continuation of U.S. patent application Ser. No. 17/482,045, filed Sep. 22, 2021, now U.S. Pat. No. 11,781,421, which claims the benefit of U.S. Provisional Patent Application Ser. No. 63/216,861, filed Jun. 30, 2021 and U.S. Provisional Patent Application Ser. No. 63/081,692, filed Sep. 22, 2020, each of which is hereby incorporated by reference in its entirety.

FIELD OF THE INVENTION

The present disclosure relates to devices and methods involved with performing measurements from a subterranean wellbore or other such underground void to produce a relative distance and direction from one point in three-dimensional space to another. In particular, the present disclosure utilizes a novel along hole current isolation and delivery system and method that conducts electrical energy to a bottom hole subsurface location so as to induce a measurable signal from a conductive member in a target wellbore in order to allow a bearing and range between wellbores to be calculated.

BACKGROUND OF THE INVENTION

The requirement to establish relative points in three dimensions from surface to subsurface position, from sub-surface positions to other subsurface positions, or from a subsurface position to a surface or subsea position has long been present. Typically referred to as ranging, the practice of calculating a distance and directional between points in space below the surface of the earth are well known and readily commercially available in industry.

A ranging determination is typically accomplished by deploying a signal source in one wellbore, and a receiver of said source in an adjacent wellbore. This arrangement can be swapped around to take advantage of a systems accuracy, ease of deployment or other convenience available to a particular operation. In most cases, two wellbores can be accessed with either the source or receiver of ranging signals, however, in some circumstances, access to an offset wellbore is not possible. Of particular concern is the situation where a wellbore has been lost due to a catastrophic event, such as a well fire or uncontrolled release of hydrocarbon, often referred to as a blowout. For all intents and purposes, access to a well may also be lost even without a fire or blowout. In some instances, the wellbore hole or casing can collapse or shear, making it practically impossible to access the wellbore concentrically down the inner diameter of the wellbore tubulars. In these situations, the damaged wellbore may need to be permanently plugged.

In the event of a blowout or plugging operation, the relative proximity between a drilling well and the blowout well is of critical importance, as a primary control technique of an out of control oil well is the deliberate intersection of the wild well with another wellbore. The intersection described allows for the control of the wild well by way of hydraulically pumping heavy mud and cement through the drilling well into the target blowout well. This operation, typically referred to as relief well drilling, requires by design the direct and deliberate contact and communication between wellbores at some deep and exact point in three-dimensional space. This is routinely accomplished by way of ranging, and has historically been addressed by magnetic ranging methods. The magnetic ranging method deployed in a relief well operation is unique however, in that the source and receiver of the signal can be thought of as being contained in a common assembly lowered into the drilling well (relief well) via a long wireline. It is necessary then to be able to induce signal on the target blowout and subsequently detect that signal with the common wireline assembly as there are no options to install a source or receiver of ranging signal in a wild well that is on fire.

The process of both creating a source of magnetic signal from a target well and receiving this signal from the same assembly in the drilling well is also well known and commercially available from at least two service providers. The assembly in question is deployed via wireline and contains an electrode that is mounted several hundred feet from a downhole receiver. Electrical power is transmitted down a multiconductor wireline and delivered into the formation in the drilling well. Injected current tends to collect preferentially on the nearby target well casing and flow axially along its length. This current has associated with it a magnetic field, and it is this magnetic field that is subsequentially detected by the wireline receiver below the electrode in the drilling well. A bearing and distance to the target well can be calculated from the sensor measurements, and the trajectory of the drilling well can be re-deigned to intersect with the casing of the blowout well. This process is described in U.S. Pat. No. 4,372,398.

A drawback of this approach relates to the fact that the ranging system referenced above must be deployed via wireline. This fact necessitates that the drilling assembly be retracted from the borehole whenever a ranging measurement is required. In practice, multiple ranging measurements will be performed in a single well in order to ensure that the target and drilling well intersect at the appropriate point. This iterative wireline-drilling-wireline-drilling process is time consuming and expensive.

To solve this problem, several inventions have been proposed to streamline the wireline deployed method. One such method, described in U.S. Pat. No. 8,695,730, seeks to contain in the drilling assembly a current source which will be separated via an electrically insulative gap sub in the assembly. This technique suffers a serious drawback, however, in that the effective circuit for current flow is localized about the drilling assembly. The effective circuit that is created downhole does not include or severely limits the along well current flow path of the target well tubular, and therefore sufficient signal for a ranging determination is often not achievable.

Another attempt to more closely align the preferred target well excitation technique with a true "while drilling" approach is the use of a wireline electrode deployed inside the drill pipe of the drilling assembly. This method is detailed in U.S. Pat. No. 9,759,060. While this technique can allow for a broader excitation of nearby target wellbore tubulars, it still involves the cessation of drilling for extended periods of time while wireline is deployed concentrically in the drill string, albeit without having to withdraw the drill string entirely. This approach is risky, however, in that it involves maintaining the drill string more or less stationary for the duration of the data collection process. This exposes the operation to mechanical and hydraulic sticking of the drill string, a non-trivial matter which often results in the permanent loss of the bottom hole assembly and drill pipe, and the permanent loss of the drilled hole and associated progress towards intersection with the target blowout well.

The present inventions seek to eliminate entirely the need for any sort of wireline deployment of instruments related to either excitation or detection, while maintaining the efficiency of target well excitation and overall range and accuracy of detection typically delivered by the wireline technique described in U.S. Pat. No. 4,372,398.

SUMMARY OF THE INVENTION

Novel systems and methods are disclosed for performing magnetic ranging while drilling. The novel system includes a bottom hole assembly with a sensor that is at least sensitive to a magnetic ranging signal. The novel system also includes a drill pipe portion or a non-rotating drilling pipe portion (coiled tubing may be used as the non-rotating drilling pipe portion) and at least one electrically insulative gap sub or similar device that influences the movement and direction of electrical energy from the drillstring into the earth/strata surrounding the well. The system also includes an electrical power supply capable of being connected at a point in the drillstring so that current can be injected into the earth/strata through the drillstring, and can accumulate on a target well and create a magnetic ranging signal.

The novel method disclosed involves the steps of inserting a bottom hole assembly containing a sensor sensitive to a magnetic range signal into a well bore. Connecting an electrical power source to a wire at an appropriate point in the drillstring. Inserting electrically insulative gap sub(s) or similar device(s) into the well bore to influence the movement and direction of electrical energy from the drillstring into the surrounding earth/strata and onto the borehole pipe of a target well. Energizing the power source so that current passes from the drillstring into the surrounding earth/strata and creates a magnetic ranging signal on a target well. Sampling/collecting the magnetic ranging signal created by the target well and adjusting the angle or direction of drilling.

DETAILED DESCRIPTION

The present disclosure relates to systems and methods for performing magnetic ranging while drilling. An example using coiled tubing while drilling is described in one embodiment, however, any non-rotating pipe or other mechanism can be used as the drillstring, which is also described herein.

To preserve the efficacy of target well excitation, a method of surface grounding referenced energy transfer is used. Specifically, the surface power supply that sends electrical energy downhole is grounded to surface and delivers electrical energy to some distance point at or near the bottom of a drilling well, which in the case of a relief well operation, could be miles from the surface position of the drilling rig and excitation power supply. To transmit power and deliver it without the use of an insulated wire, the drill pipe of the drilling well can instead be crafted to allow for an insulated path through which electrical current can flow. This can be done while minimizing leakage along the current path length, while minimizing the overall electrical resistance encountered by electrons in the circuit, and can be directed precisely to an electrical current delivery point which is typically some hundreds of feet near the deepest point in the drilling well.

Figure 1:
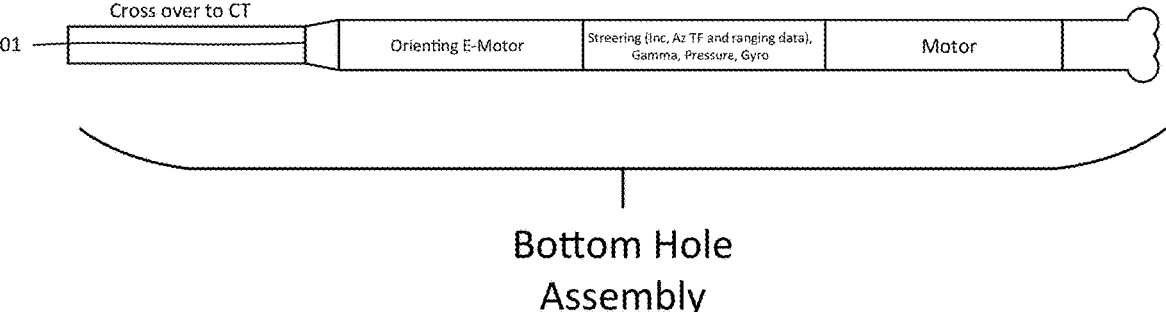
FIG. 1 is an example of a bottom hole assembly of a coiled tubing drilling rig assembly.

FIG. 1 depicts an exemplary bottom hole assembly of a drilling rig using coiled tubing. Bottom hole assemblies may comprise of motors, steering mechanisms, orienting motors and other devices as identified in FIG. 1. More or less components than are identified in FIG. 1 can also make up the bottom hole assembly. Within the coiled tubing is run a multiline 101 to deliver power to various sensors and equipment in the bottomhole assembly. The individual conductors in the multiline are typically used to establish bi-directional communications with a plurality of downhole sensors involved with formation evaluation and directionally drilling the wellbore. These instruments include but are not limited to gamma ray sensors, pressure sensors, directional drilling steering sensors, and magnetic range sensors, amongst many others. Another common use of some of the multi conductors present in the pre-installed wireline bundle includes the delivery of power (electrical energy) to a downhole device. For example, in some coiled tubing directional drilling systems, electrical energy is delivered to a downhole electrical motor by way of several conductors of the multi-line bundle. The motor turns to orient the bent housing of a hydraulically driven mud motor, thereby enabling the coiled tubing operator to intentionally orient and therefore steer or deviate the trajectory of the wellbore. This, of course, is but one use of the multi-conductor lines. In the same spirit, some of the multi-conductor lines can also be assigned to target well excitation. Specifically, one or more of the multi-conductor lines can be connected on surface to a magnetic ranging current injection power supply, and used to deliver an excitation current into the formation at or near the bottom hole assembly (downhole terminus) of the coiled tubing unit. The connection to the coiled tubing can also be made at any point in the run of the tubing, including at surface. Since the coiled tubing assembly does not rotate about its long axis, the wire installed on the ID of the tubing spool can be permanently installed in the coil as they cannot entangle or break. Alternatively, one or more separate conductor(s) from a current injection power supply can be connected to the coiled tubing to supply current down the coiled tubing and into the formation to create a magnetic ranging signal on a target well. As with the connection of conductors of a multiline conductor, these conductors can be connected to the coiled tubing at any location on surface or within the wellbore. Depending on the place of connection, conductors can be temporarily connected to the coiled tubing or permanently connected to the coiled tubing.

Figure 2:
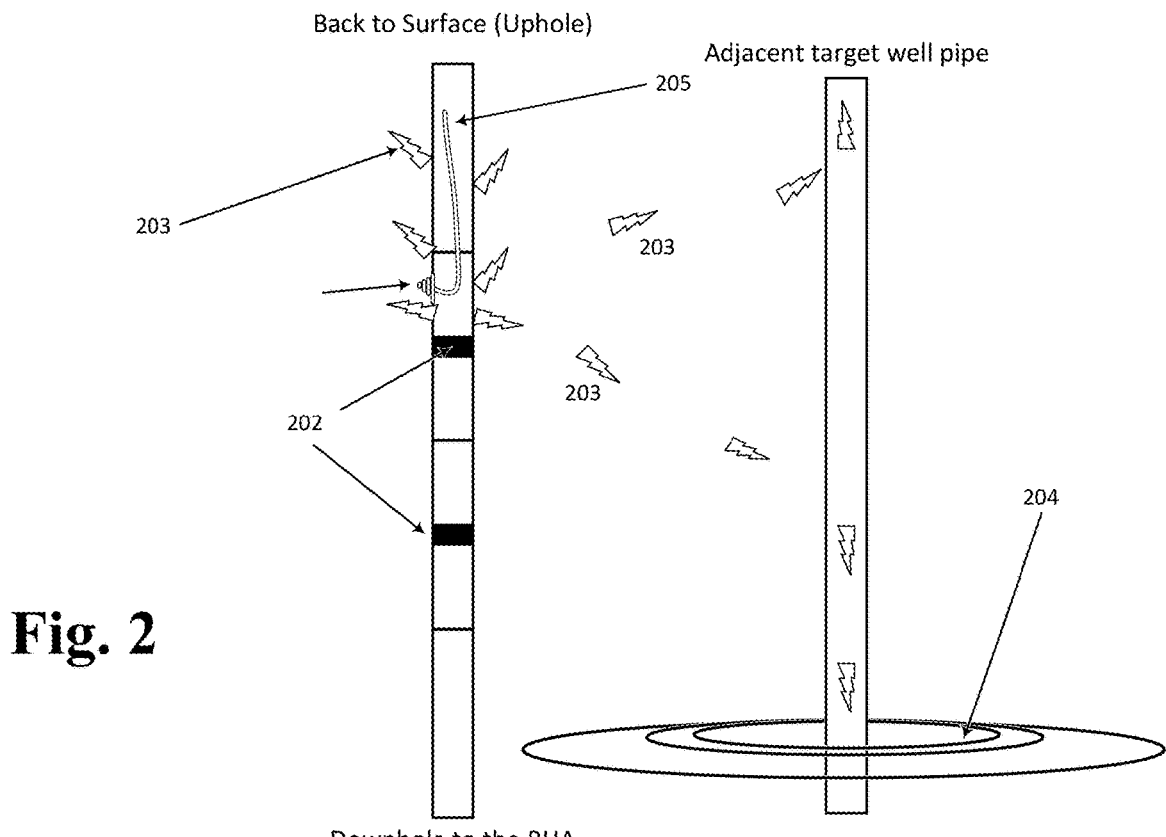
FIG. 2 is an example of a current injection system using gap subs to prevent downhole current flow and sensor contamination.
Figure 3:
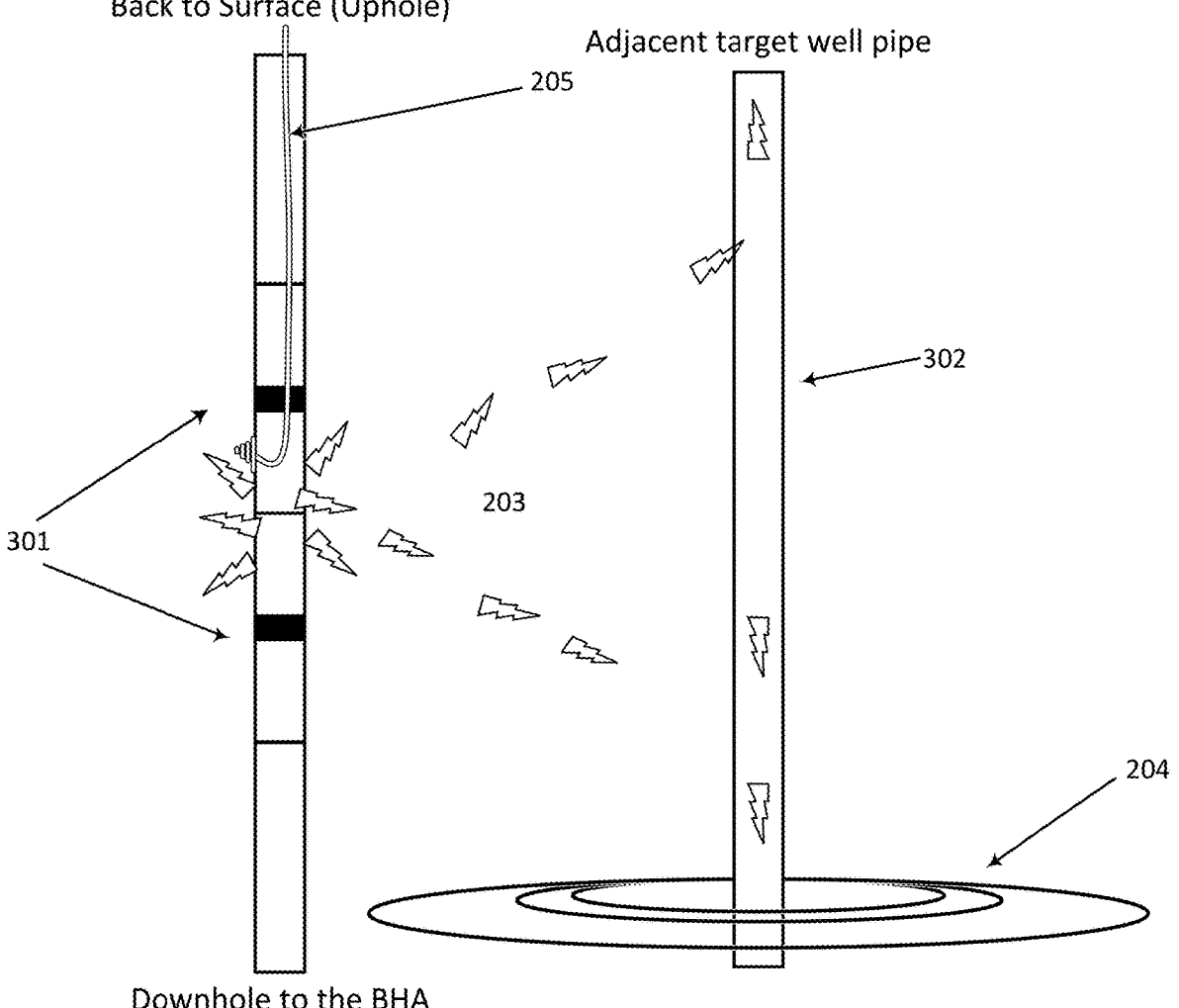
FIG. 3 is an example of a bracketed current injection apparatus that creates a ranging signal about a target well pipe.

To accomplish magnetic ranging as described herein, as shown in FIG. 2, current is delivered in the coiled tubing to a specific point 201 in the drillstring or bottom hole assembly. As before, the current supplied via an electrical conductor 205 can be from one or more conductors of a multiconductor line, or can be one or more separate conductors. As shown in FIG. 2, structure also substantially prevents current from flowing to the distal end of the pipe where the sensors are located and substantially prevents current from flowing back up the coiled tubing towards the surface. As shown in FIG. 2, electrically insulative gap subs 202 are shown. These gap subs are designed to force current 203 to inject at one or more points along the drill string, or allow the injection to occur over some length of the drill string, thereby maximizing or minimizing surface area over which electrical current can flow into the formation. The gap sub has an electrical discontinuity along its length, but still allows for mechanical integrity of the coiled tubing to remain. This can be accomplished by a ceramic layer that is press fit or heat fit between steel elements of the sub. Those familiar with the state of the art will acknowledge that this is but one way of several well know methods to create an electrically insulative gap sub. The sub must also either force the electrical short circuit of the inner conductive element of the drill pipe to the exterior of the drill pipe, or allow the current to pass through the insulative gap and be delivered downhole. (as shown in FIG. 3) Both configurations are desirable depending on the specific downhole circumstances. To accomplish the direct short circuit of injection current, one or more injection wires can be terminated to the sub above (uphole from) its insulation point. When delivered above the electrical discontinuity of the sub, the current injected tends to flow up the coiled tubing pipe, but also flows through formation and onto the target well casing, thereby creating the desired magnetic ranging signal 204.

On some occasions, it is also desirable to inject current into the formation at a specific depth along the long axis of the coiled tubing system. This is shown in FIG. 3. To accomplish this, more than one gap sub 301 can be installed in the bottom hole assembly or drillstring. These subs can be thought of as bracketing the excitation point, with one or more gap subs uphole of the excitation point, and one or more gap subs below the excitation point. These subs essentially force current to flow on a specific portion of the bottom hole assembly or drillstring and subsequently flow into the formation as a result of metal to earth contact of the bracketed section of the coiled tubing pipe, and thereafter the current flows onto the target well 302. An example of this type of configuration for creating a magnetic ranging signal in a target well is shown in FIG. 3.

It is important to note that the apparatus described above ensures that current is injected in the section of the coil pipe bracketed by the uphole and downhole gap subs. This is a requirement of certain relief wells and other ranging contexts, as the injection of current at a particular section of the coil pipe allows for the management of environmental effects which tend to reduce the efficacy of the current injection method. These effects include but are not limited to, formation heterogeneity, drilling fluid composition, formation resistivity and target well tubular discontinuities. The aforementioned gap sub can therefore be thought of as being able to simultaneously "flow through" current and drilling fluid, a feature that is of importance to the operation of the present invention.

Current injection and magnetic ranging while drilling is accomplished by the apparatus disclosed herein. Current is injected in the vicinity of a target, without removing the drill stem. With current emanating into the formation, and a distal return path for the driving surface power supply, the physics described in U.S. Pat. No. 4,372,398 has been preserved. A plurality of magnetometers, accelerometers and gyroscopes embedded in the bottom hole drilling assembly can sample the target well signal, and a bearing and distance to the target can be readily calculated. The raw sensor data can be transmitted to surface via industry standard telemetry methods, or the computed bearing and proximity information can be calculated via an onboard microprocessor, and the resulting information transmitted accordingly.

Figure 4:
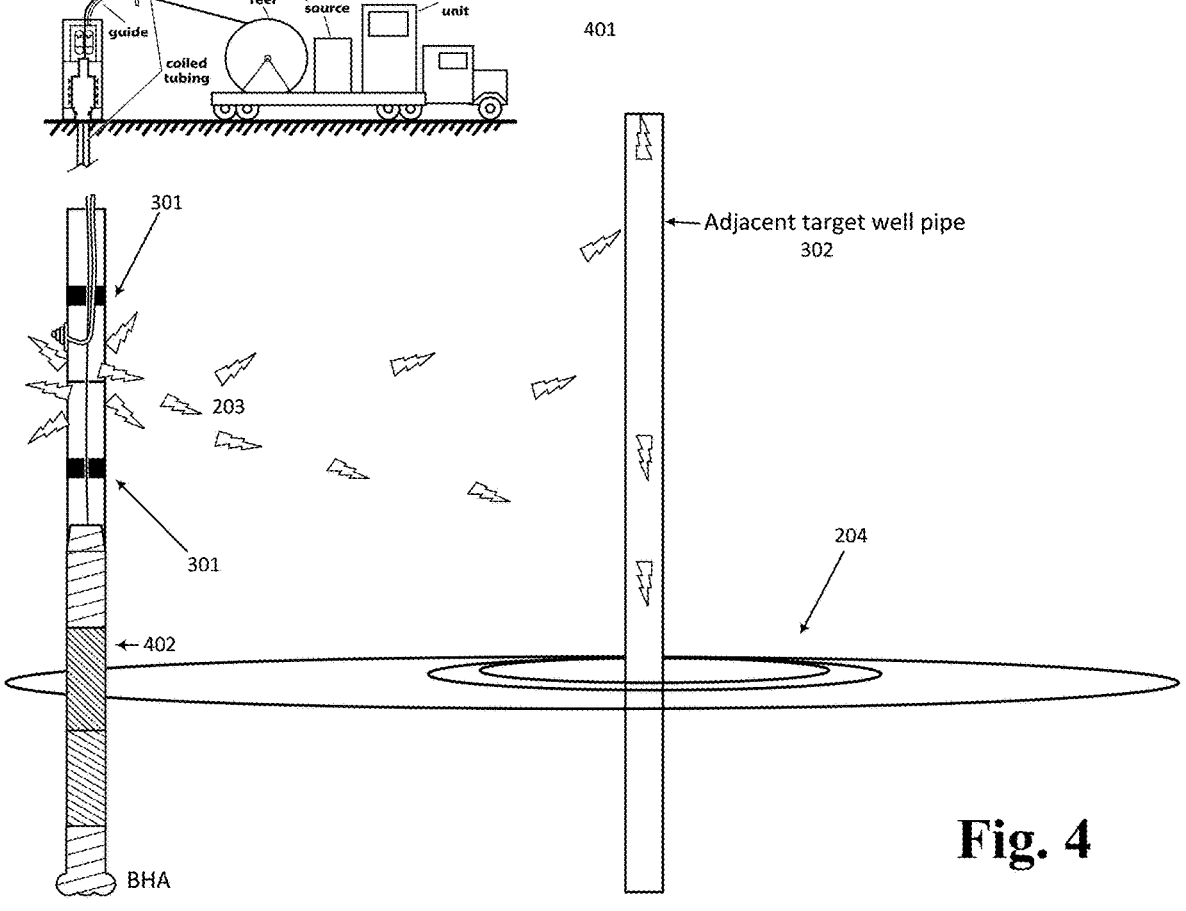
FIG. 4 is an example of a drilling system using coiled tubing to implement a ranging while drilling system.

FIG. 4 shows an example of the ranging while drilling operation using a coiled tubing drilling rig. The method of preparing for and deploying the apparatus is as follows:

1. Install in the drilling bottom hole assembly or drillstring a sensor 402 that is at least sensitive to the magnetic ranging signal 204 that is to be created on the target well 302

2. Install electrically insulative gap subs 301 or similar in the bottom hole assembly or drillstring so as to influence/force the flow of electrical energy 203 into the earth/strata and onto the target well 302 while isolating current from flowing on and contaminating/negatively influencing the magnetic field measurement acquisition of the sensor embedded in the bottom hole assembly 3. Install and electrically connect at least one wire from the coiled tubing wire bundle (found on the inside diameter of the coiled tubing), or a separate conductor, to a point in the drillstring that has been suitably electrically isolated as per step #2.

4. Connect the wire(s) that have been grounded to the drillstring downhole (as per step 3) to a surface magnetic ranging current injection power supply 5. Drill the well as per normal, or trip the bottom hole assembly into a previously drilled well 6. When a relative bearing and distance from the drilling well to the target well is desired/required, energize the surface power supply from step #4. This will subsequently inject current into the formation at or near the gap sub arrangement which was installed in the bottom hole assembly in Step 2. Current will flow through the formation, collect on the target well, and a resulting magnetic ranging signal is thus created.

7. Sample/query the sensor installed in the bottom hole assembly during step #1. The sensor can have integral to it a microprocessor which computes the magnetic ranging distance and direction, along with other information, and transmit the "answers" to surface via various telemetry methods, or the raw data sampled from the sensor can be transmitted to surface and the ranging information be calculated on surface by the surface computer. If the sensor microprocessor computes the answer downhole, the information could be passed directly to an autonomous drilling system to be actioned during drilling (e.g. positional ranging information could be passed to an autonomous rotary steerable system and be actioned downhole without human intervention or interpretation)

8. Using the magnetic ranging answer from step 7 to adjust operations to achieve the particular goal of the deployment. E.g. replan the drilling well to intersect the target well, replan the drilling well to avoid the target well, replan the drilling well to stay in close proximity to the target well, etc. The describe steps need not be completed in any particular order, and one of skill in the art would know that some steps can be completed before or after others.

Figure 5:
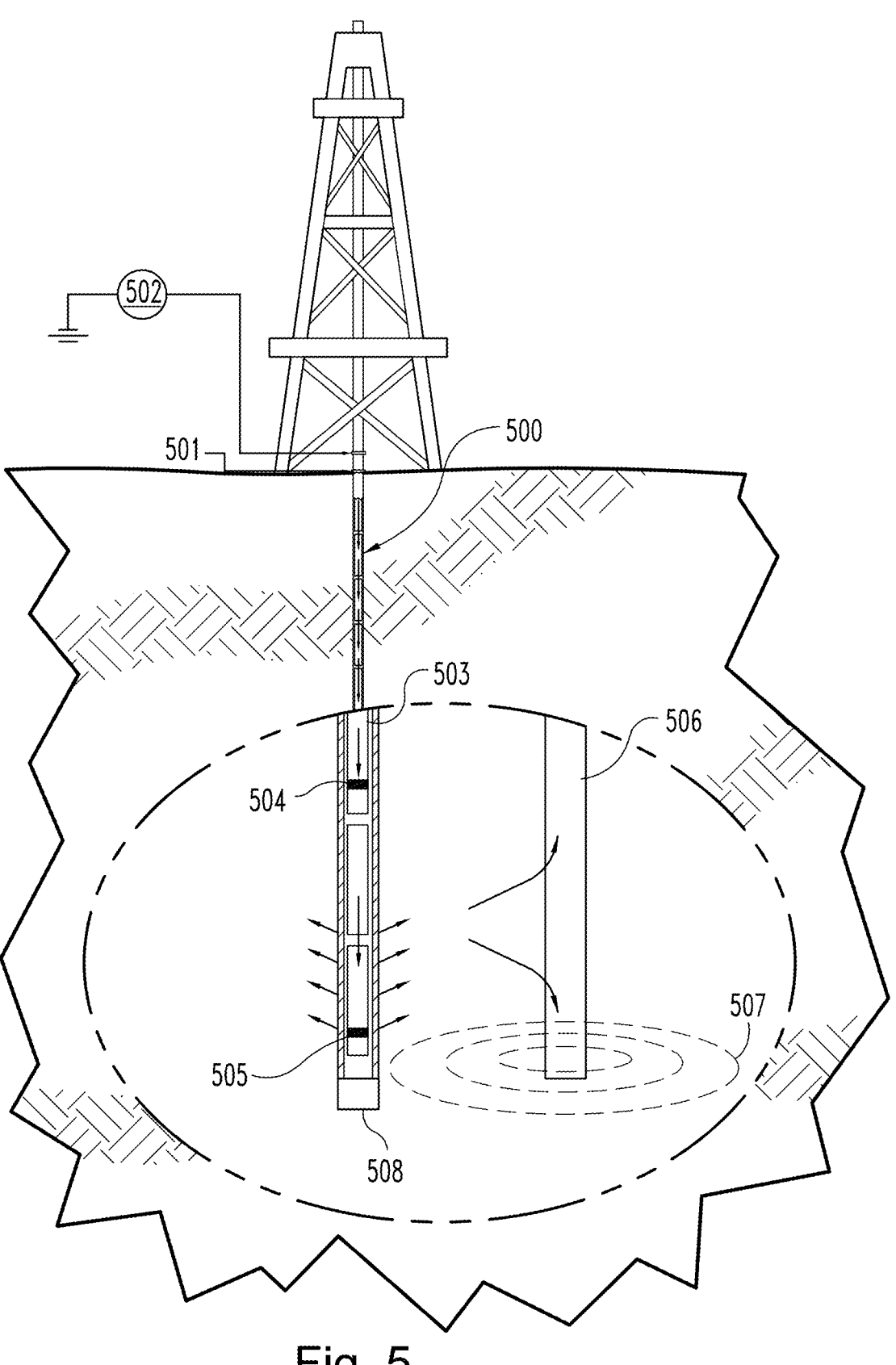
FIG. 5 is an example of a drilling set up and current injection system using various subs and/or shorting mechanisms to pass current into the reservoir.

In another embodiment, the apparatus contains three parts, a surface sub which allows for the injection of current into the drill string at the drill floor, a current path along the drill pipe made up of multiple pipe sections, and the isolation and gap subs at or near the distal end of the drill string which allow for control over the precise injection point of the electrical energy responsible for target well excitation. FIG. 5 shows an example of magnetic ranging while drilling system. The system uses drill pipe 500 connected in sections. A surface sub 501 transmits current from an electrical source 502 to the drill string. A current carrying mechanism 503 is carried on the inside of the drill string to allow current to be carried down the drill string. A flow through sub 504 is provided in the drill string and a standard gap sub 505 is also provided. In this arrangement, current passes down the drill string through the flow through sub until it hits the gap sub. The presence of the gap sub prevents current from flowing further downhole and causes current to enter the material adjacent the drill string (e.g., subterranean formation). As current leaves the drill string it will travel through the subterranean formation to contact a target well 506. A magnetic field 507 is created and detected by a sensing unit 508 located at or near the distal end of the drill string.

Figure 8:
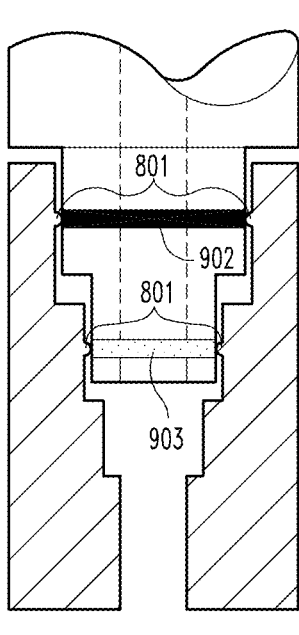
FIG. 8 is an example of a shorting mechanism used in the current injection system.

Alternatives to gap subs, for example, other shorting mechanisms, can also be used. Shorting mechanisms can be used to replace one or more gap subs in the system described herein. An example of a shorting mechanism is shown in FIG. 8. The shorting mechanism brings the electrical connectors carried by the drill string together to create a short circuit, thus providing an alternative mechanism to direct the current carried by the conductor in the drill string to the subterranean formation. In FIG. 5, the vertical arrows represent current being carried by the conductor of the drill string and the angular arrows represent flow of electrons into the subterranean formation.

The surface sub which transmits electrical energy from the power supply to the drill pipe will typically be installed in the rotating member of the top drive robot and provide an insulated channel through which current can flow, be attached to the injection power supply, and allow for rotation while power is being delivered. This can readily be accomplished by a brush and rotor arrangement, similar to a commutator assembly in any electrical turning machine. Alternative current delivery methods and devices can also be used.

Figures 9A, 9B, 9C:
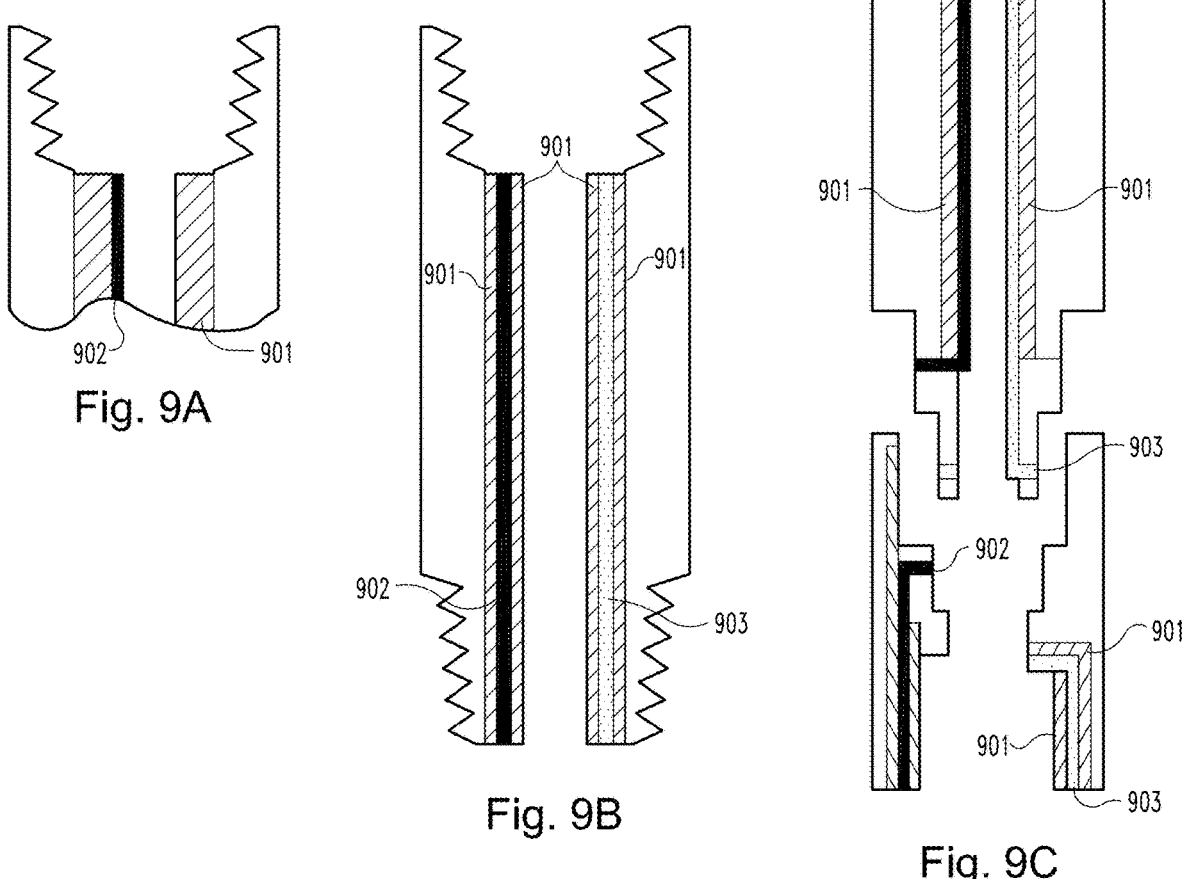
FIG. 9A is an example of a single conductor in a drill pipe with an insulating material on one side.
FIG. 9B is an example of two conductors in a drill pipe with insulating material surrounding the conductors.
FIG. 9C is an example of a connector used to connect the conductors of a current injection system.

The multiple drill pipes which will make up sections of the long current channel leading to the distal end of the bore contain at least one isolated conductive element. The isolation for this element can provide insulation from the drill pipe body itself, along with the electrically conductive fluid that will be pumped down the drill pipes. One solution for this has been described in application US20190119990, where a radially expansive conductive element is used to line the interior of an industry standard drill pipe. This conductive member is both insulated from the ID of the drill pipe and the drilling fluid being pumped down the drill pipe by an electrically insulative epoxy coating. However, the conductive member may also be insulated from the drill pipe by any conventional method known by one of skill in the art, one example being an epoxy coated drill pipe containing a conductive element that is insulated from the body of the drill pipe but is not insulated from the fluid pumped down the drill pipe. It is important to note that the inventions disclosed herein are meant to deliver electrical power into the formation. As a result, the preferred embodiments of the inventions disclosed involves coating a section or all of the ID of a commercial pipe with a nonconductive material such as epoxy, and then installing one or more ribbons of insulated conductor into the epoxy layer as show in FIGS. 9A-9C. FIG. 9A shows a section of drill string coated on its inner diameter with an insulating material such as epoxy 901. A current carrying mechanism 902, such as an insulated or uninsulated ribbon, a braided wire, an impregnated material or any suitable conductor is located in close proximity to, or embedded into, the insulating material. FIG. 9B shows an example of two separate conductors 902 and 903. Each conductor/ribbon can land on either side of the drill pipe on one or more conductive rings, or on a ring that is stepped so as to allow for separate "channels" to be dedicated to each ring and conductor/ribbon pair. This allows for additional configurations of current injection and return paths, an arrangement which will be discussed at length in a forthcoming section of this disclosure. FIG. 9C shows an example of a mechanism for connecting the conductive rings as described. In this example, the two separate conductors are connected using a step connection. Conductor 903 is contacted using a smaller diameter ring 904 and conductor 902 is contacted using larger ring 905. The ring assures contact from box to pin of the drill pipes when joints of pipe are added to the drill stem. As will be appreciated by one of skill in the art, there are multiple manners in which to contact/connect the conductors of each segment of drill pipe while isolating each conductor, thus providing multiple paths for current flow.

Another embodiment of the invention involves a three-step coating process that layers nonconductive and conductive coatings inside a common piece of pipe. Firstly, a non-conductive epoxy is coated inside the ID of the pipe. Next, the conductive ring is installed on each end of the pipe and a second conductive layer of silver (or other conductive material) impregnated epoxy (or similar insulating material) is applied. Finally, an additional layer of non-conductive epoxy (or similar insulating material) is installed. This has the effect of protecting the inner conductive layer from electrical contact with both the drill pipe and the drill pipe fluids, all while providing an insulated current path for excitation energy to be transmitted from surface. Another embodiment could use braided wires or other conductive wiring between epoxy (or similar insulating material) layers to provide similar insulation of the drill pipe and drilling fluids.

Figure 6:
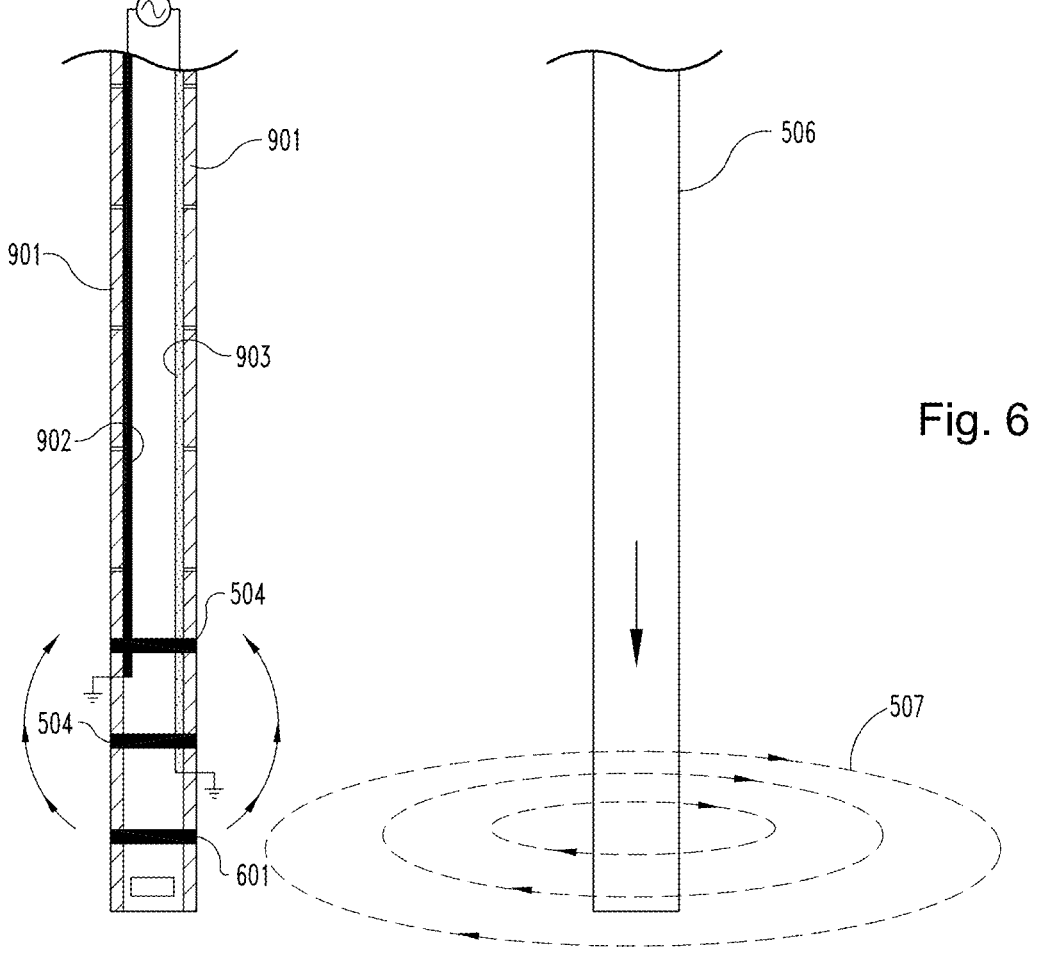
FIG. 6 is an example of a current injection system using separate current flow conductors in a drill string.

FIG. 6 is an example of using magnetic ranging with separate conductors inside of the drill string. In this example, gap sub 601 causes current flow from drill string that is carried by conductor 903 and enter formation above the gab sup. Separate conductor 902 provides for the flow of current from the surrounding formation and back to surface.

Figure 7:
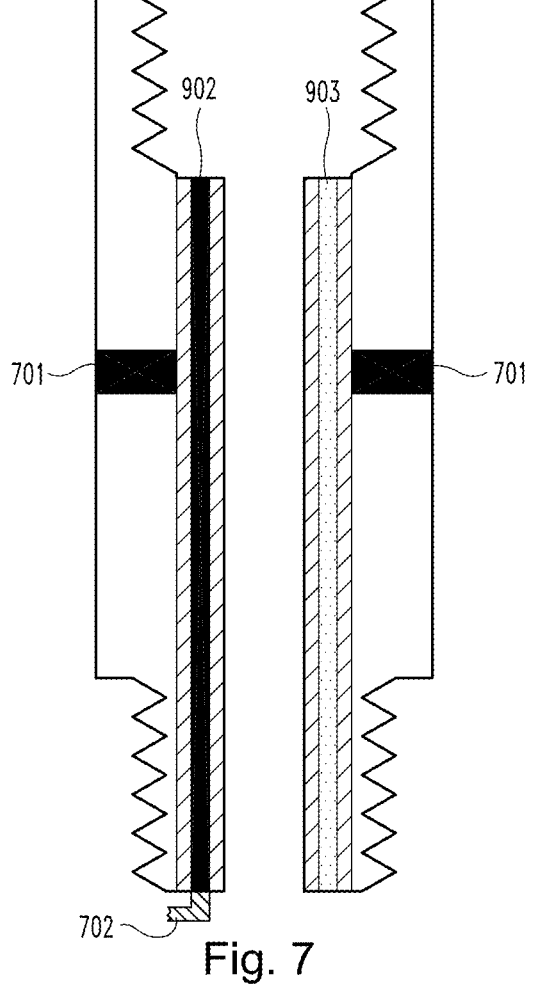
FIG. 7 is an example of a flow through sub in a current injection system.

FIG. 7 is an example of a flow through sub. In this exemplary flow through sub, ceramic material 701 prevents current flow from the drill pipe uphole, while conductor 903 provides for connection 702 to the body of the drill pipe and allows current to flow from the drill pipe to the surrounding formation. Conductor 902 may carry current uphole, or further downhole for injection at another point closer to the distal end of drill string. As will be appreciated by one of skill in the art, a combination of flow through subs and gab subs can be used to inject current at different precise locations along the drillstring.

The inventions disclosed herein can use different types of currents and/or frequencies and can be sampled and analyzed using one or more devices to optimize the magnetic ranging while drilling methods disclosed.

To perform magnetic ranging, current is directed to inject at a specific point or points along the drill pipe and be prevented from flowing to the distal end of the pipe where the sensors that are used for magnetic ranging will be housed. This is accomplished by electrically insulative gap subs or other electrically insulative devices which will effectively force current to inject at one or more points along the drill string, or allow the injection to occur over some length of the drill string, thereby maximizing or minimizing surface area over which electrical current can flow into the formation. The "Gap sub" can have an electrical discontinuity along its length, but still allow for mechanical integrity of the drill string to remain. This can be accomplished by a ceramic layer that is press fit or heat fit between steel elements of the sub. Such electrically insulative "gap" subs are readily available in industry. The sub can either force the electrical short circuit of the inner conductive element of the drill pipe to the exterior of the drill pipe, or allow the current to pass through the insulative gap and be delivered downhole. Both configurations are desirable depending on the specific downhole circumstances and can be accommodated. To accomplish the direct short circuit of injection current, the box end of the sub can contain a ring which both electrically connects the insulated conductive element to the outer OD of the drill pipe and gap sub.

To pass current through the gap sub, a similar arrangement as has been described by the pipe manufacturing process detailed above can be deployed. This allows for the up-hole current to be delivered below the ceramic gap in the isolation sub. In another embodiment, this short sub can easily be gun drilled and one or more insulated conductors installed in the axial channel created in the sub body. These conductors can either be shorted to the OD of the sub body once past the insulative gap, or be shorted to the lower half of the drill string by way of a modified conductive ring described above and pictured in FIG. 7. It is important to note that the apparatus described ensures that current is injected in the section of pipe bracketed by the uphole and downhole gap subs. The injection of current at a particular section of the drill pipe allows for the management of environmental effects which tend to reduce the efficacy of the current injection method. These effects include but are not limited to, formation heterogeneity, drilling fluid composition, formation resistivity and target well tubular discontinuities. The aforementioned gap sub can therefore be thought of as being able to simultaneously "flow through" current and drilling fluid, which enables the current inventions.

FIG. 8 is an example of a shorting mechanism as describe herein. Conductive points 801 can be used to connect conductor 902 and 903 such that they are short circuited.

Current injection in the vicinity of the target, without removing the drill stem, can be achieved using the inventions disclosed. Furthermore, current delivered can be maximized due to the availability of a low impedance circuit that is available by greater effective conductor cross sectional area as compared to a typical wireline conductor gauge size. With current emanating into the formation, and a distal return path for the driving surface power supply, the physics described in U.S. Pat. No. 4,372,398 has been preserved. As described in the cited prior art, a plurality of magnetometers, accelerometers and gyroscopes embedded in the drilling assembly can now sample the target well signal, and a bearing and distance to the target can be readily calculated. The raw sensor data can be transmitted to surface via industry standard telemetry methods, or the computed bearing and proximity information can be computed via an onboard microprocessor, and the resulting information transmitted accordingly.

An appropriate isolating physical or solid state disconnect can be installed in the drill stem, and the channelized conductors in the drill stem was passed to the downhole near bit measurement system, the microprocessor could use the channelized conductors to transmit the data or information after the excitation and magnetic field sampling event had concluded. This would allow for faster bi-directional communications between up hole and subsurface processors but comes with the requirement of electrical isolation.

While the inventions have been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

What is claimed is:

1. An apparatus for magnetic ranging comprising:
   a power supply;
   at least one section of drill pipe configured to be operatively connected to the power supply;
   at least one wire inside the at least one section of drill pipe that permanently connects the power supply and the at least one section of drill pipe;
   a first electrically insulated member electrically connected with the at least one section of drill pipe; and
   a magnetic ranging sensor.

2. The apparatus of claim 1 further comprising a second electrically insulated member located further downhole from the first electrically insulated member.

3. The apparatus of claim 1 wherein the magnetic ranging sensor is part of a bottom hole assembly.

4. The apparatus of claim 1 wherein the magnetic ranging sensor is part of the drill pipe.

5. The apparatus of claim 1 wherein the drill pipe is coiled tubing.

6. The apparatus of claim 1 wherein the drill pipe is a section of threaded drill pipe.

7. The apparatus of claim 1 wherein the power supply is connected to the drill pipe using at least one wire of a multiribbon wire.

8. The apparatus of claim 1 wherein the power supply is connected to the drill pipe using one or more conductors.

9. An apparatus for magnetic ranging comprising:
   a power supply;
   at least one section of drill pipe operatively connected to the power supply;
   at least one wire inside the at least one section of drill pipe that connects the power supply and the at least one section of drill pipe, wherein the connection between the wire and the drill pipe is a permanent connection;
   a first electrically insulated member electrically connected with the at least one section of drill pipe and that is capable of causing electrical energy to exit a section of drill pipe; and
   a magnetic ranging sensor.

10. The apparatus of claim 9 further comprising a second electrically insulated member located further downhole from the first electrically insulated member.

11. The apparatus of claim 9 wherein the magnetic ranging sensor is part of a bottom hole assembly.

12. The apparatus of claim 9 wherein the magnetic ranging sensor is part of the drill pipe.

13. The apparatus of claim 9 wherein the drill pipe is coiled tubing.

14. The apparatus of claim 9 wherein the drill pipe is a section of threaded drill pipe.

15. The apparatus of claim 9 further comprising a second electrically insulated member located further downhole from the first electrically insulated member.

16. The apparatus of claim 9 wherein the power supply is connected to the drill pipe using at least one wire of a multiribbon wire.

17. The apparatus of claim 9 wherein the power supply is connected to the drill pipe using one or more conductors.

18. A method of magnetic ranging comprising:
installing a magnetic ranging sensor in a wellbore;
installing a first electrically insulative gap sub in a wellbore;

installing at least one section of drill pipe in a wellbore that is connected to the electrically insulative gap sub;
connecting a power supply to at least one section of drill pipe using at least one wire that is located inside the at least one section of drill pipe, wherein the connection from the at least one wire to the at least one section of drill pipe is a permanent connection;
energizing the power supply to cause current to flow down the drill pipe and inject into a wellbore formation and travel to a target well to create a magnetic ranging signal;
sampling the magnetic ranging signal; and
adjusting the drilling operations to alter a characteristic of the drilling operations.

19. The method of claim 18 further comprising adjusting the drilling operations to alter a second characteristic of the drilling operations.

20. The method of claim 18 further comprising installing a second electrically insulative gap sub downhole from the first electrically insulative gap sub.

21. The method of claim 18 wherein the step of sampling the magnetic ranging signal occurs while drilling is taking place.

* * * * *